United States Patent Office 3,448,670
Patented June 10, 1969

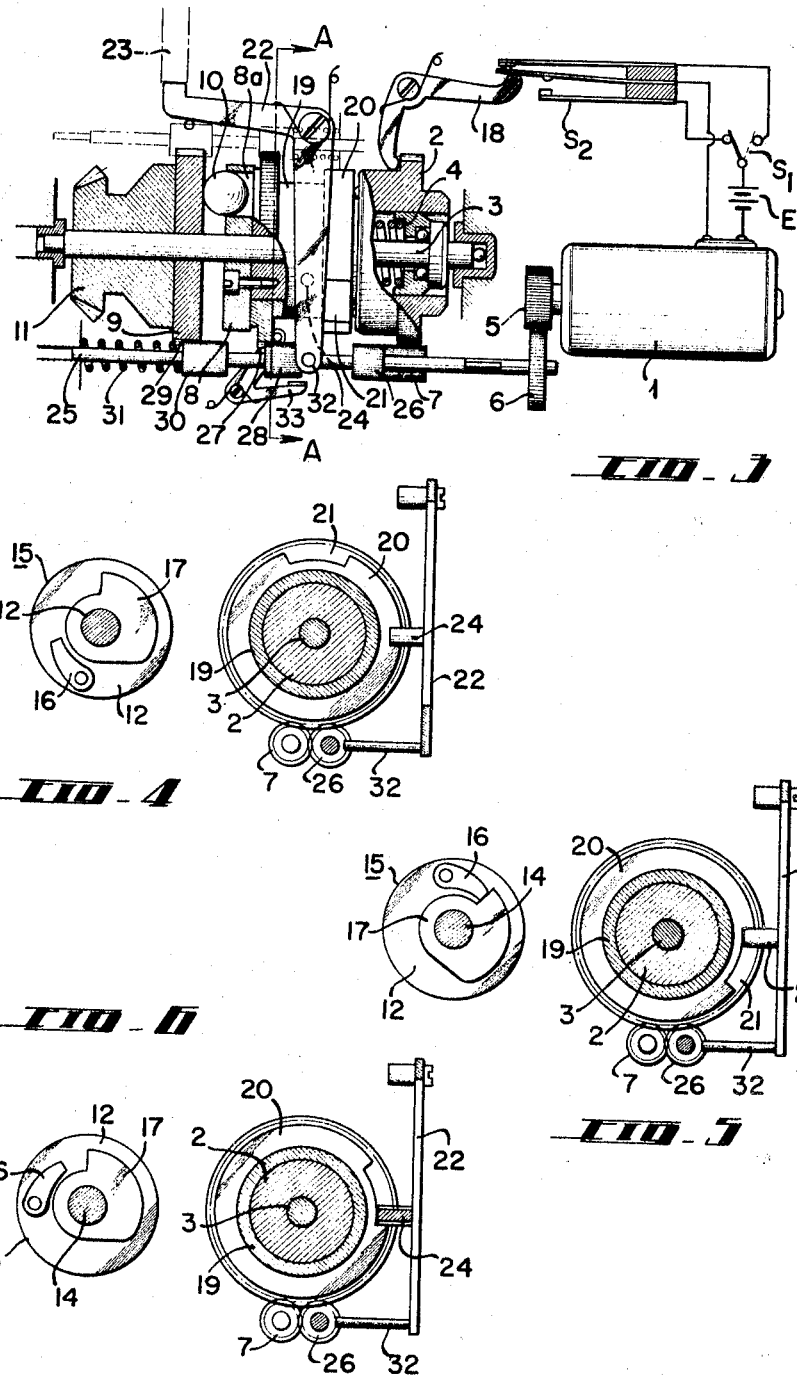

3,448,670
AUTOMATIC CAMERA SHUTTER RELEASE AND FILM ADVANCING MECHANISM
Minoru Suzuki, Tokyo-to, Japan, assignor to Asahi Kogaku Kogyo Kabushiki Kaisha, Tokyo-to, Japan, a corporation of Japan
Filed Feb. 13, 1967, Ser. No. 615,530
Claims priority, application Japan, Feb. 19, 1966, 41/9,931
Int. Cl. G03b 19/04
U.S. Cl. 95—31      9 Claims

ABSTRACT OF THE DISCLOSURE

An electrically operated camera which advances the film and cocks and fires the shutter for each of a series of photographs upon being actuated by the operator. The shutter release mechanism is actuated by the axial movement of the film drive. This axial movement is caused by a ball registered between the plates of a clutch. The ball causes the plates to separate when the clutch begins to slip.

BACKGROUND OF THE INVENTION

The present invention relates generally to improvements in camera shutter release systems and it relates particularly to an improved motor driven shutter release and film advancing mechanism.

In the automatic film advancing mechanism of a camera in which upon completion of a photographic sequence the film advancing and cocking operations are automatically performed and such operations are remote-controlled so as to enable the user to perform successive photographic operations, first the preparatory operation such as film winding and shutter cocking is completed by a motor drive and then the shutter release operation is initiated by the next motor drive. Therefore, in such systems, the motor operation must be suitably timed to said preparatory and shutter release operations. The timing operation must be so accomplished that after the completion of the preparatory operation the release lever is actuated by the release manipulation or order, and the next preparatory operation is effected only after the shutter release mechanism has returned to its original state which is just before the shutter release operation.

In order to accomplish a "bulb" exposure with the above system, it is necessary that, first a shutter release order be given, for example by depressing the actuating button to actuate the motor which in turn motivates the release lever and initiates the shutter operation, the motor being then automatically stopped, and then, after a lapse of a predetermined time, said actuating button is released, which again actuates the motor which then first returns the release lever and effects the preparatory operation. In such operation, the release lever is for a time retained at the release actuating positon. Therefore, if the shutter arrangement is set to "bulb" condition, the shutter remains open for said time, and is closed upon the subsequent release lever return movement, thus performing the "bulb" operation. By effecting the preparatory operation after the release lever return movement, the release and the preparatory operations are carried out without any mutual interference and remotely controlled photographic operation is carried out in an excellent manner.

SUMMARY OF THE INVENTION

It is a principal object of the present invention to provide an improved camera shutter control and film advancing mechanism.

Another object of the present invention is to provide an improved camera shutter control and film advancing mechanism provided with a "bulb" exposure actuating arrangement.

Still another object of the present invention is to provide an improved remotely controlled automatic "bulb" exposure control and automatic film advancing mechanism.

A further object of the present invention is to provide an improved shutter sequence actuating and film advancing mechanisms in which the shutter opening and closing actuations and the film advance and shutter cocking are automatically performed in properly timed sequences.

The above and other objects of the present invention will become apparent from a reading of the following description taken in conjunction with the accompanying drawings which illustrate a preferred embodiment of the present invention.

In a sense the present invention contemplates the provision of the combination with a camera including a film advance member and a shutter release member, of a drive motor, means including a rotatable slip coupling connecting said drive motor to said film advance member, and means responsive to the slip condition of said slip coupling for controlling the actuations of said shutter release member. Advantageously, in the improved system, the film advancing member is connected through a lost motion one way drive and the slip coupling to the drive motor the slip coupling including a drive member and a driven member which separate when slipping occurs and a release ring is coaxially rotatably carried by the coupling drive member and is axially movable therewith, the release ring being provided with a peripheral surface which controls the shutter release member. A gear change over transmission is provided which is shifted in response to axial movement of the coupling drive member to reverse drive the drive disc and release ring or forward drive the release ring, depending upon the condition of the slip coupling. The release ring actuates a lever which controls the shutter release, the actuating and return movements of the lever are responsive to the angular and axial positions of the release ring as above effected.

The improved mechanism is rugged and reliable and provides a system which can be remotely controlled for performing a "bulb" timed shutter exposure and the automatic advance of the film in a properly timed sequence.

BRIEF DESCRIPTION OF THE DRAWINGS

FIGURE 3 is a view similar to FIGURE 1, illustrated however with the film advanced and the shutter in a closed cocked position;

FIGURE 4 is a sectional view taken along line A—A and B—B in FIGURE 1;

FIGURE 5 is a sectional view similar to FIGURE 4 following the closing of the shutter and the start of the film advance; and FIGURE 6 is a sectional view similar to FIGURE 4 following the film advance.

DESCRIPTION OF THE PREFERRED EMBODIMENT

Figure 1:
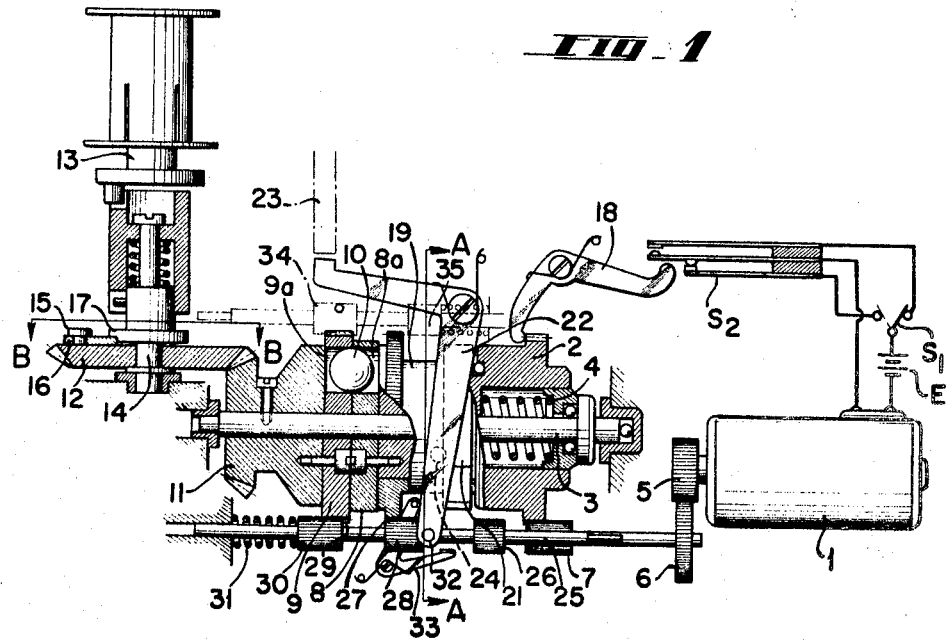
FIGURE 1 is a side elevational view, partially in sections, of a mechanism embodying the present invention illustrated in the shutter open position.

Referring now to the drawings which illustrate a preferred embodiment of the present invention employed in a camera including a shutter release element 23 the raising of which releases the shutter to its open position and the release of which releases the shutter to its closed position to effect a "bulb" timed shutter sequence, the reference numeral 1 designates an electric motor which motivates the improved mechanism. The motor 1 has one terminal connected through an energizing battery or current source E to the arm of a double throw manually operated switch S1 which may be located proximate or remote from the camera and its other terminal connected to the arm of a second double throw switch S2. One of each of the contacts of the switch S1 is connected to one of each of the contacts of the switch S2. A main drive shaft 2 is rotatably and axially displaceably mounted on a longitudinal axle 3 and is normally resiliently urged to the left as viewed in FIGURE 1 by a helical compression spring encircling the axle 3 and housed in a well in the shaft 2 and entrapped between the base of the well and a stop carried by the axle 3. The shaft 2 has a peripheral gear formed thereon which is coupled to a motor mounted gear 5 through mutually fixed gears 6 and 7.

A ball-slip joint or clutch comprises a driving disc 8 fixed to one end of the driving shaft 2 and a driven disc 9 normally closely engaging the driving disc 8 and releasably coupled thereto by a steel ball 10 registering with holes 8a and 9a formed in the discs 8 and 9 respectively to accommodate the ball 10. A bevel gear 11 and the engaging disc 9 are joined and supported by the axle 3 and rotate as a unitary body. Another bevel gear 12 engaging the bevel gear 11 is coupled to a shaft 14 connected to the film winding or advancing shaft 13 through a lost motion one way drive of ratchet arrangement 15 including a pawl 16 which is secured to one side of the bevel gear 12, and engages a single tooth ratchet wheel 17 which is fixed to the shaft 14.

A bell crank switch lever 18 is pivoted to a fixed pin and has one end thereof engaging a forwardly directed peripheral shoulder of driving shaft 2 and the other operating end thereof positioned adjacent the arm of movable contact member of changeover switch S2.

A release ring 19 is rotatably mounted on driving shaft 2, and includes a peripheral flange 20 at its rear end which flange is provided with a cutout section or recess 21. A bell crank release lever 22 is pivoted to a fixed pin and is spring urged counterclockwise in FIG. 1 and has one end thereof positioned adjacent the lower end of the shutter release member 23 and the other operating end provided with a pin 24 which engages the flange 20 of release ring 19.

A longitudinal shaft 25 is supported for longitudinal horizontal displacement in either direction and is provided with a gear 26 which is movable therewith into separable engagement with gear 7 when the shaft 25 is displaced to the right, another gear 28 which separably engages a peripheral gear portion 27 formed on the release ring 19 in a manner to be described later, and a gear 30 normally engaging a peripheral gear 29 formed on the engaging disc 9. A helical spring 31 urges the shaft 25 to the right as viewed in FIG. 1. A pin 32 fixed to one end of the release lever 22 abuts against the rear of right side surface of the gear 28 as seen in FIG. 1 so as to prevent the shaft 25 from moving to the right in FIG. 1 due to the action of the spring 31. In the path of the movement of the gear 28 there is positioned one end of a pivotally mounted bell crank engaging lever 33. The other end of lever 33 is positioned in the path of the movement of the driving shaft 2 so that upon the movement of the driving shaft 2 to the right in FIG. 1 in an action to be described later, the lever 33 is turned clockwise as viewed in FIG. 1 against the action of a spring attached thereto so as to withdraw the end thereof which is positioned in the movement path of the gear 28 out of registry with said path.

The operation of the mechanism described above is set forth below in connection with "bulb" photographing operation.

In FIG. 1, the release lever is in its clockwise position against the spring influence, with the pin 24 abutting the flange portion 20 of the release ring 19 and one end of the release lever 22 raising the shutter release pin 23 of the camera, so that in the "bulb" operation the shutter is kept open and film exposure is under way. On the other hand, the pin 32 at the other end of the release lever 22 abuts the rear end face of the gear 28. The shaft 25 is thus maintained in its advance forward position with the gear 28 engaging the gear portion 27 of the release ring 19 and the gear 30 engaging the gear portion 29 of the engaging disc 9.

The drive motor 1 is deenergized and inoperative since the current supplying circuit remains open because the actuating switch $S_1$ and the change-over switch $S_2$ are in the positions as shown in solid line in FIG. 1, these switches having been changed-over to such positions upon the shutter opening release actuation.

When the actuating switch $S_1$ is manually changed-over to the dotted line position of FIG. 1, the current supply circuit is closed to energize and bring the motor 1 into operation whereby to rotate the driving shaft 2 through the gears 5, 6 and 7. At this time, the steel ball 10 between the driving disc 8 and the driven disc 9 is in the holes 8a and 9a so that the ball-slip coupling consisting of the discs 8 and 9 and the ball 10 is in a power transmitting condition. Accordingly, the rotary drive is transmitted through the engaging disc 9, the bevel gears 11 and 12, the lost motion ratchet arrangement 15 to the film winding shaft 13 of the camera to advance the film. It should be noted that initially the relative position of the pawl 16 and the ratchet wheel 17 is as shown in FIG. 4 so that there is some play until the pawl 16 engages the ratchet wheel 17 to drive the film winding shaft 13 due to movement of the bevel gear 12.

During the period the pawl 16 advances to the position shown in FIG. 5 due to rotation of the bevel gear 12, the release ring 19 is turned through the gear 30 engaging the gear portion 29 of the engaging disc 9 and the gear 28 turning in unison with the gear 30. Due to this turning movement, the cutout 21 of the flange 20 is advanced to a position registering with the pin 24 so that the pin 24 drops into the cutout 21 (FIG. 5). Then, under influence of the spring, the release lever 22 turns counterclockwise and returns to its former position, i.e. that which it occupied prior to the release actuation. Simultaneously with this, the shutter release pin 23 moves downward so that the shutter hitherto remaining open is now closed and the "bulb" operation is terminated.

On the other hand, the above movement of the release lever 22 causes the pin 32 to move to the right, so that due to the action of the spring 31 the gears 28 and 30 and the shaft 25 move to the right. During this movement, the gear 28 engages one end of the engaging lever 33 so that the movement is halted with the gear 28 at the position where it just leaves engagement with the gear portion 27 of the release ring 19 and power transmission to the release ring 19 is stopped.

Figure 2:
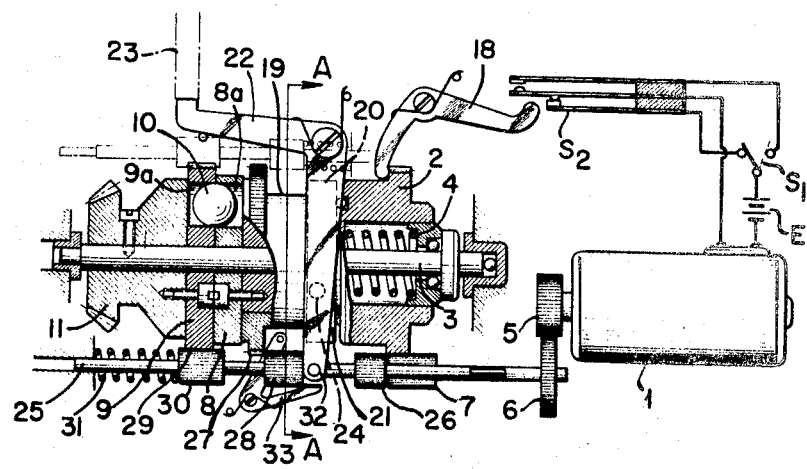
FIGURE 2 is a view similar to FIGURE 1, illustrated however, with the shutter in its closed position and prior to the automatic film advance.

Further drive by the motor 1 brings the pawl 16 into engagement with the ratchet wheel 17 to turn the same so that the driving power is transmitted to and rotates the winding shaft 13 (FIGS. 2 and 5). Thus the film advancing operation is effected with the release ring 19 slipping over the drive shaft 2.

When a predetermined length of film is wound by the winding shaft 13 the film deed is automatically stopped in the known manner so that an excessive load is exerted upon the engaging plate 9. This results in a ball-slip action of the steel ball 10 between the engaging disc 9 and the driving disc 8 so that driving power transmission to the film winding shaft 13 is stopped. Upon this ball-slip action the steel ball 10 comes out of the hole 9a of the engaging disc 9 and pushes the driving disc 8 to the right against the action of the spring 4 so that the gear 28 again engages the gear portion 27 of the release ring 19 (FIG. 3). Consequently the driving shaft 2 and the release ring 19 also move to the right, so that one end of the engaging lever 33, the other end of which engages the gear 28, is pushed by the gear portion 27 of the release ring 19. Thus, the engaging lever 33 is turned clockwise against the spring urge and disengages the gear 28. Accordingly, the gear 28 and the shaft 25 further move to the right due to the action of the spring 31 so that gear 26 fixed to the shaft 25 is brought into engagement with the gear 7 coupled to the motor 1, with the gear portion 27 still engaging the gear 28, and the gear 30 still engaging the gear portion 29 of the engaging disc 9.

Accordingly, the engaging disc 9, which has been coupled to the motor 1 through the driving shaft 2 and the driving disc 8, is now coupled to the motor 1 through the shaft 25. This results in reversed rotation of the engaging disc 9, and the release ring 19 is driven in a direction opposite to that of the driving shaft 2.

On the other hand, the switch lever 18 with one end thereof engaging the stepped shoulder portion of the driving shaft 2 is caused to swing counterclockwise due to the movement of the driving shaft 2, so that the other end thereof raises the movable arm of the change-over switch S₂ to open the hitherto current supplying circuit of the motor 1. Consequently, the reversed rotation of the engaging disc 9 and the release ring 19 is promptly stopped. Thus, the preparatory operation of film winding and shutter charge is completed.

To effect the shutter release operation, the actuating switch S₁ is changed-over to the position as indicated in dotted line in FIG. 3 so that current is again supplied to the motor 1 and under the aforementioned coupling condition the engaging disc 9 and the release ring 19 are rotated in a direction opposite to that of the driving disc 8. As a result of this reversed rotation, the state of the release ring 19 and of the release lever 22 and the relation between the pawl 16 and the ratchet wheel 17 of the ratchet arrangement 15, will shift from the state as shown in FIG. 5 indicating the last stage of the preparatory operation to that as shown in FIG. 4. The mutually reversed rotations of the driving disc 8 and the engaging disc 9 also results in engagement again of the hole 9a by the steel ball 10 which has been out of the hole 9a since the completion of film winding operation.

Owing to the above movement of the steel ball 10, the driving disc 8 and the driving shaft 2 move to the left in FIG. 3 due to the action of the spring 4, the release ring 19 also moving simultaneously therewith. At this time, the flange 20 of the release ring 19 is in such a position that the cutout 21 is out of registration with the pin 24 of the release lever 22 (FIG. 4), so that upon said movement of the release ring 19 the flange portion 20 pushes the pin 24, thereby turning the release lever 22 clockwise against the spring urge.

As a result of this movement of the release lever 22, the shutter release member 23 is pushed up by one end of the lever 22 to thereby initiate the shutter opening operation, while the pin 32 on the other end of lever 22 abuts the gear 28 and moves it to the left against the action of the spring 31 so that the gear 26 fixed to the shaft 25 is brought to a position out of engagement with the gear 7. Thus, the power transmission for reversed rotation of the release ring 19 and the engaging ring 9 upon release actuation is now stopped.

On the other hand, the movement of the driving shaft 2 to the left also causes the switch lever 18 to be turned clockwise against the spring urge so that the change-over switch S₂ is actuated to open the hitherto current supplying circuit of the motor 1. As a result, the film winding and the release driving means are returned to the initial state shown in FIG. 1. By making the initially mentioned operation after a lapse of time, "bulb" operation and subsequent preparatory operation of film winding, etc. can be automatically performed.

In order to facilitate the engagement and disengagement of the gear 28 with the gear portion 27 of the release ring 19, it is effective to provide a guide gear mechanism wherein a gear 35 rotates with a gear 34 as a unitary body, which gear 34 normally engages the gear portion 29 of the engaging disc 9, and the gear 35 is brought into engagement with said gear portion 27 immediately before said gear 28 engages the gear portion 27.

Thus, in the arrangement according to the present invention, by providing the conventional automatic film winding arrangement with the simple power transmission change-over and other mechanisms including the release ring 19, the gears 26, 28, 30, etc., the shutter releases and the release lever return operations are regulated to cooperate with the film winding operation of the automatic winding device so that not only can the film winding operation and shutter release operation be accurately related to each other without causing any trouble, but also a "bulb" exposure utilizing the automatic winding arrangement can be performed.

While there has been described and illustrated a preferred embodiment of the present invention it is apparent that numerous alterations, omissions and additions may be made without departing from the spirit thereof.

What is claimed is:

1. In combination with a camera including a film advance member and a shutter release member, a drive motor, means including a rotatable slip coupling connecting said drive motor to said film advance member, and means responsive to the slip condition of said slip coupling for controlling the actuation of said shutter release member.

2. The combination of claim 1 wherein said slip coupling includes coaxially movable drive member and driven member said drive member being coupled to said motor and said driven member being coupled to said film advance member and means responsive to slippage between said drive and driven members for effecting the axial separation thereof, said shutter release actuating means being responsive to said axial movement of said coupling drive member.

3. The combination of claim 2 wherein said shutter release member actuating means includes a release ring coaxial with and axially movable with said slip coupling drive member and rotatable relative thereto, and comprising means responsive to said axial movement of said release ring for rotating said release ring said shutter release member actuating means being responsive to the axial movement and rotation of said release ring.

4. The combination of claim 1 wherein said shutter release member actuating means includes a rotatable release ring coaxial with said slip coupling and comprising means responsive to the slip condition of said slip coupling for rotating said release ring, said shutter release member actuating means being responsive to the rotation of said release ring.

5. The combination of claim 1 wherein said slip coupling includes a rotatable driven member coupled to said film advance member and a coaxial relatively axially movable rotatable drive member coupled to said drive motor for forward rotation thereby and means responsive to slippage between said drive and driven members for effecting the axial separation thereof, said shutter release member actuating means including a rotatable release ring coaxial with said slip coupling, and comprising means responsive to the separation of said slip coupling drive and driven members for rotating said release ring in a reverse direction, said shutter release member actuating means being responsive to the rotation and axial movement of said release ring.

6. The combination of claim 5 including means responsive to the axial separation of said slip coupling drive and driven members for rotating said driven member in a reverse direction.

7. The combination of claim 5 wherein said slip coupling drive and driven members comprise coaxial disc members having confronting faces and provided with equally radially spaced recesses, said drive and driven member separating means including a ball element registering with said recesses, and including spring means urging said drive and driven members toward each other.

8. The combination of claim 5 wherein said drive motor comprises an electric motor and including a current source having one terminal connected to one terminal of said motor, a first double throw manually operable switch and a second double throw switch said switches having arms connected to the other terminals of said motor and current source respectively and having corresponding contacts interconnected, and means responsive to the axial movement of said slip coupling drive member for actuating the arm of said second switch.

9. The combination of claim 5 wherein said film advance member includes a shaft and said means for connecting said motor to said film advance member includes a lost motion one way drive positioned between said shaft and said slip coupling driven member.

References Cited

UNITED STATES PATENTS 3,135,182   5/1964   Hintz et al. _____ 95—31

NORTON ANSHER, *Primary Examiner.*

R. A. SCHROEDER, *Assistant Examiner.*